US009633269B2

(12) United States Patent
Gu et al.

(10) Patent No.: US 9,633,269 B2
(45) Date of Patent: Apr. 25, 2017

(54) IMAGE-BASED LIVENESS DETECTION FOR ULTRASONIC FINGERPRINTS

(71) Applicant: QUALCOMM Incorporated, San Diego, CA (US)

(72) Inventors: Jin Gu, Toronto (CA); Ming Yu Chen, Santa Clara, CA (US); Eliza Yingzi Du, Cupertino, CA (US); Kwokleung Chan, Sunnyvale, CA (US); Esra Vural, Santa Clara, CA (US); Saurav Bandyopadhyay, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/845,174

(22) Filed: Sep. 3, 2015

(65) Prior Publication Data

US 2016/0070968 A1 Mar. 10, 2016

Related U.S. Application Data

(60) Provisional application No. 62/046,744, filed on Sep. 5, 2014, provisional application No. 62/151,983, filed on Apr. 23, 2015.

(51) Int. Cl.
*G06K 9/46* (2006.01)
*G06K 9/00* (2006.01)
(Continued)

(52) U.S. Cl.
CPC ......... *G06K 9/00906* (2013.01); *G06K 9/001* (2013.01); *G06K 9/0002* (2013.01);
(Continued)

(58) Field of Classification Search
CPC ........... G06K 9/00899; G06K 9/00906; G06K 9/00107; G06K 9/00114
See application file for complete search history.

(56) References Cited

U.S. PATENT DOCUMENTS

| 5,456,256 A | 10/1995 | Schneider et al. |
| 7,505,613 B2 | 3/2009 | Russo |
| (Continued) | | |

FOREIGN PATENT DOCUMENTS

| EP | 1835438 A1 | 9/2007 |
| WO | 0124700 A1 | 4/2001 |
| (Continued) | | |

OTHER PUBLICATIONS

Warwante et al., Wavelet Based Fingerprint Liveness Detection), International Journal of Engineering Research and Applications (IJERA) ISSN: 2248-9622, vol. 2, Issue 2,Mar.-Apr. 2012, pp. 1643-1645.*

(Continued)

*Primary Examiner* — Brian P Werner
(74) *Attorney, Agent, or Firm* — Weaver Austin Villeneuve & Sampson LLP

(57) ABSTRACT

A liveness-detection method and/or system is disclosed. A method of detecting liveness can comprise obtaining a single ultrasonic image of a biometric object. The single ultrasonic image can be subdivided into a plurality of overlapping sample blocks. Feature vectors can be extracted in a spatial domain and a frequency domain from each of the plurality of sample blocks. The feature vectors can be compared from each of the plurality of sample blocks to a classification model.

28 Claims, 12 Drawing Sheets

(51) Int. Cl.
  *G06T 7/32* (2017.01)
  *G06T 7/33* (2017.01)
  *G06T 7/44* (2017.01)

(52) U.S. Cl.
  CPC ..... *G06K 9/00093* (2013.01); *G06K 9/00107* (2013.01); *G06K 9/00114* (2013.01); *G06T 7/32* (2017.01); *G06T 7/337* (2017.01); *G06T 7/344* (2017.01); *G06T 7/44* (2017.01); *G06T 2207/10132* (2013.01); *G06T 2207/20064* (2013.01); *G06T 2207/20072* (2013.01)

(56) References Cited

U.S. PATENT DOCUMENTS

| | | | |
|---|---|---|---|
| 7,738,681 | B1 | 6/2010 | Rannow et al. |
| 7,804,984 | B2 | 9/2010 | Sidlauskas et al. |
| 2003/0202687 | A1 | 10/2003 | Hamid et al. |
| 2005/0084154 | A1* | 4/2005 | Li ............ G06K 9/4652 382/190 |
| 2005/0259850 | A1 | 11/2005 | Shimamura et al. |
| 2007/0030475 | A1 | 2/2007 | Rowe et al. |
| 2007/0092115 | A1 | 4/2007 | Usher et al. |
| 2007/0230754 | A1 | 10/2007 | Jain et al. |
| 2008/0253625 | A1 | 10/2008 | Schuckers et al. |
| 2009/0316963 | A1 | 12/2009 | Boshra |
| 2010/0008552 | A1 | 1/2010 | Shin et al. |
| 2010/0113952 | A1 | 5/2010 | Raguin et al. |
| 2010/0251824 | A1* | 10/2010 | Schneider ............ A61B 5/1172 73/620 |
| 2011/0158535 | A1* | 6/2011 | Iio ............ G06K 9/4642 382/190 |
| 2012/0263355 | A1* | 10/2012 | Monden ............ G06K 9/00114 382/124 |
| 2013/0058544 | A1 | 3/2013 | Sayac et al. |
| 2013/0202182 | A1 | 8/2013 | Rowe |
| 2014/0226879 | A1 | 8/2014 | Westerman et al. |
| 2014/0241596 | A1 | 8/2014 | Chen et al. |
| 2016/0070967 | A1 | 3/2016 | Du et al. |

FOREIGN PATENT DOCUMENTS

| | | |
|---|---|---|
| WO | 2006042144 A2 | 4/2006 |
| WO | 201412467 A1 | 8/2014 |

OTHER PUBLICATIONS

Galbally et al., "A high performance fingerprint liveness detection method based on quality related features", 2010 Elsevier, 2 cover pages + pp. 311-321.*
Drahansky M., "Liveness Detection in Biometrics," Advanced Biometric Technologies, 2011, 21 pages.
Arulkumaran T., et al., "Fingerprint Based Age Estimation Using 2D Discrete Wavelet Transforms and Principal Component Analysis", International Journal of Advanced Research in Electrical Electronics and Instrumentation Engineering, Mar. 3, 2013 (Mar. 3, 2013), pp. 1060-1066, XP055227078, Retrieved from the Internet: URL: http://www.ijareeie.com/upload/march/14_Fingerprint%20Based.pdf [retrieved on Nov. 10, 2015].
Toth B, "Biometric Liveness Detection", Information Security Bulletin, Chi Publishing, Oct. 1, 2005, XP007906384, vol. 10, pp. 291-298.
International Search Report and Written Opinion—PCT/US2015/048583—ISA/EPO—Nov. 11, 2015.
International Search Report and Written Opinion—PCT/US2015/048581—ISA/EPO—Nov. 23, 2015.
International Preliminary Report on Patentability—PCT/US2015/048583—ISA/EPO—Aug. 30, 2016.
International Prelimminary Report on Patentability—PCT/US2015/048581—ISA/EPO—Dec. 8, 2016.
U.S. Office Action dated Oct. 27, 2016, issued in U.S. Appl. No. 14/845,149.
Bossen A., et al., "Internal Fingerprint Identification With Optical Coherence Tomography", IEEE Photonics Technology Letters, vol. 22, No. 7, Apr. 1, 2010, pp. 507-509.
Mela G., et al.,"Fingerprint Recognition Using Haar Wavelet Transform and Local Ridge Attributes Only," Jan. 31, 2014 (Jan. 31, 2014), XP055292736, Retrieved from the Internet: URL: http://www.ijarcsse.com/docs/papers/Volume_4/1_January2014/V4I1-0103.pdf [retrieved on Aug. 2, 2016].
U.S. Corrected Notice of Allowability dated Mar. 8, 2017, issued in U.S. Appl. No. 14/845,149.
U.S. Notice of Allowance dated Feb. 16, 2017, issued in U.S. Appl. No. 14/845,149.

* cited by examiner

IMAGE-BASED LIVENESS DETECTION FOR ULTRASONIC FINGERPRINTS

CROSS-REFERENCE TO RELATED APPLICATIONS

This application claims priority to U.S. Provisional Application No. 62/046,744 filed on Sep. 5, 2014, now pending, and U.S. Provisional Application No. 62/151,983 filed on Apr. 23, 2015, now pending, the disclosures of which are incorporated herein by reference in their entirety. This application incorporates the disclosure of copending U.S. application Ser. No. 14/845,149 entitled "Multi-Stage Liveness Determination" filed concurrently herewith on Sep. 3, 2015 in its entirety.

FIELD

The present disclosure relates to devices and methods for detecting whether a biometric has been provided by a live-being.

BACKGROUND

Biometric sensors are widely used to distinguish between individuals that are authorized to engage in an activity and individuals that are not authorized to engage in that activity. For example, fingerprint sensors are commonly used to determine whether a fingerprint provided by an individual matches information in a database, and if a match is determined, then the individual may be allowed to engage in an activity. For example, the individual may be allowed to enter a building or room, or allowed to use an electronic device such as a mobile phone or an application running on a mobile device.

Biometric sensors can be deceived (a.k.a. "spoofed"), and thereby permit an unauthorized individual to engage in an activity that is reserved for authorized individuals. Spoofing a fingerprint sensor may be accomplished in different ways. These include using a fake fingerprint, using body parts other than a finger, and using a dead finger from a person. Since it is unlikely that the particular type of spoofing to be used on a fingerprint sensor will be known in advance, it is important to guard against all types of spoofs. One method of guarding against spoofing involves determining whether the biometric object exhibits characteristics associated with liveness.

As more and more biometrics are used for user identification and/or verification, liveness detection becomes increasingly important in order to ensure access security and accuracy. Liveness detection is important because many methods of deceiving an identification system and/or verification system use spoofs that are not alive. For example, a latex finger may be made to have ridges and valleys resembling a fingerprint of an authorized user. When such a latex spoof is presented to a fingerprint sensor, the scanning system may falsely conclude that the latex spoof is the finger of an authorized user, even though the latex spoof is not part of a living being. Therefore, a system that is able to detect whether a biometric object is part of a live being would be useful in detecting the presence of a spoof. In such a system, if a determination is made that a biometric object is not part of a live individual, then the individual presenting the biometric object may be denied access (for example, access to a requested activity) even if the biometric information (such as a fingerprint) matches information in an associated identification/verification database.

SUMMARY

One implementation of the present disclosure is a method of detecting liveness. The method may comprise obtaining a single ultrasonic image of a biometric object.

The method may further comprise subdividing the single ultrasonic image into a plurality of overlapping sample blocks. In one implementation, at least a subset of the plurality of sample blocks overlap with at least another of the subset of the plurality of sample blocks.

The method may further comprise extracting feature vectors in a spatial domain and a frequency domain from each of the plurality of sample blocks. The feature vectors may include a histogram feature. The histogram feature may include ultrasonic impedance characteristics of ridges and valleys of the biometric object. The histogram feature may also include one or more of the following: ridge energy, ridge entropy, ridge variance, ridge skewness, ridge kurtosis, ridge variance coefficient, valley energy, valley entropy, valley variance, valley skewness valley kurtosis, and valley variance coefficient.

The method may further comprise comparing the feature vectors from each of the plurality of sample blocks to a classification model. The feature vectors include an image-quality measurement. The image-quality measurement may include one or more of the following: ridge orientations smoothness, ridge orientation certainty level, and a Gabor-based feature. Comparing the feature vectors may include weighting a first set of the plurality of sample blocks relative to a second set of the plurality of sample blocks.

The feature vectors may also include cross-ridge-valley features. The cross-ridge-valley features may include one or more of the following: ridge and valley separation in gray scale values, ridge and valley width, ridge-to-valley transition rate, valley-to-ridge transition rate, a frequency spectrum of a Fourier transform of a gray scale profile along a direction, and a ratio of image brightness of ridges of the biometric object to image brightness of valleys of the biometric object. The feature vectors may also include an image-pattern feature, for example, a wavelet-based feature.

The feature vectors may include ratio-based features. The ratio-based features may include a ratio of individual features between ridge and valley of the biometric object. The ratio-based features may include one or more of the following: ratio of mean of ridge and valley, ratio of median of ridge and valley, ratio of energy of ridge and valley, ratio of entropy of ridge and valley, ratio of variance of ridge and valley, ratio of skewness of ridge and valley, ratio of kurtosis of ridge and valley, and ratio of variance coefficient of ridge and valley.

The method may further comprise altering the classification model based upon the comparison of the feature vectors to the classification model. In another implementation, the method may further comprise altering the classification model based upon the single ultrasonic image of the biometric object.

The disclosure may also be embodied as a method or system for determining whether a biometric was obtained from a live individual, and thus may be used to determine whether the biometric permits an activity. Such a method or system may employ vectors associated with liveness data based on histogram features, ratio-based features, cross-ridge-valley features, imaging quality features, and/or special image patterns, such as wavelet-based features. Textural features (raw features), such as histogram-based statistics, may be calculated for both ridges and valleys present in the biometric.

In order to detect spoofs when, for example, the collected image is noisy or the biometric shown in the image is forged (thus leading to imperfections in the image), a block-based method of classification may be used. In such a classification method, feature vectors (such as those computed from one or more of the five groups identified above) can be extracted from each sample block of an image, and based on those feature vectors a decision regarding liveness is made with respect to each of the sample blocks. A decision regarding whether a particular image came from a live individual or not may be made by fusing (e.g., mathematically combining based on a determined algorithm) the classification decisions from each of the sample blocks.

Because it may be difficult to find a set of features that are universally optimal for making a liveness determination, it may be prudent to adopt a subject-specific classification method. In such a method, a set of features derived from images known to come from a particular individual are obtained and identified as being good liveness indicators for that individual. In one implementation, the set of features may be derived from scan data, or collected non-image data. Machine learning algorithms could be used to build the subject-specific classifier. Furthermore, by applying a high level learning methodology to identify those features that are good liveness indicators and build the classifier, it may be possible to reduce the computation of feature extraction by specifying the extraction of only those features that have been determined to be good liveness indicators for that individual.

Advantages of the method or system may include one or more of the following: (a) single-image based method for liveness detection; (b) resistance to the effects of noisy images or problematic fingerprints; and (c) liveness determinations that do not require perfect segmentation of ridges and valleys because the system or method does not depend on an accurate ridge/valley mask.

BRIEF DESCRIPTION OF THE DRAWINGS

For a fuller understanding of the nature and objects of the invention, reference should be made to the accompanying drawings and the subsequent description. Briefly, the drawings are.

DETAILED DESCRIPTION

The application may be embodied as methods and systems for detecting liveness. In some implementations, liveness can be detected based upon the use of a plurality of image-based features that are derived from a biometric, such as a fingerprint. The image-based features may be in the spatial and/or frequency domains, and may be used to determine whether a particular biometric is a real or a fake biometric. For purposes of illustration, certain aspects of the application will be described with reference to fingerprints and ultrasonic fingerprint sensors, but the application is not limited to these.

Figure 1:
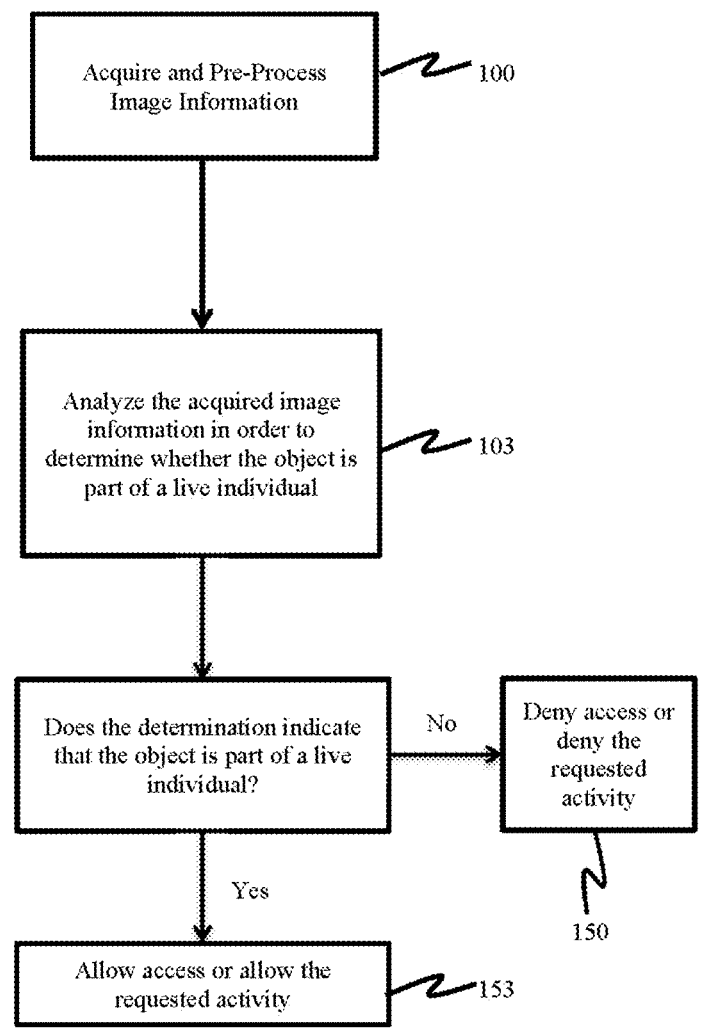
FIG. 1 is a schematic depicting how a liveness detection system/method may be part of a larger system/method.

FIG. 1 is a flow diagram depicting a method that includes determining liveness. Image information about a biometric object may be acquired 100 and analyzed 103 in order to determine whether the biometric object is part of a live individual. The image information used to determine liveness may be the same information used to generate an image of the object. For example, the image information may be information about a fingerprint that was acquired 100 using an ultrasonic sensor, such as described in U.S. Pat. No. 7,739,912 entitled "Ultrasonic Fingerprint Scanning Utilizing a Plane Wave." Analysis of the image information may be carried out by one or more multipurpose computers or processors that have been programmed to analyze the image information, such as one or more applications processors of a mobile device. The acquired image information or data may be pre-processed as needed, for example, to reduce noise, increase contrast, remove artifacts, or compensate for temperature effects. If the analysis 103 of the image information indicates that the biometric object is not part of a live individual, then an activity requested (including activities that are merely desired, such as access to an application or authorization of a purchase) may be denied 150. For example, if the individual requests access to a facility, computer database, or mobile device application and the information analysis indicates that the biometric object was not part of a live individual, then the individual may not be permitted to gain access to the facility, database or application, as the case may be. However, if analysis of the image information indicates that the biometric object is part of a live individual, then the individual may be allowed 153 to gain access to the facility, database, or application, as the case may be. In some implementations, identification, verification or authentication of the user may be required in addition to an indication of liveness before access may be granted or a requested activity is allowed.

Figure 2:
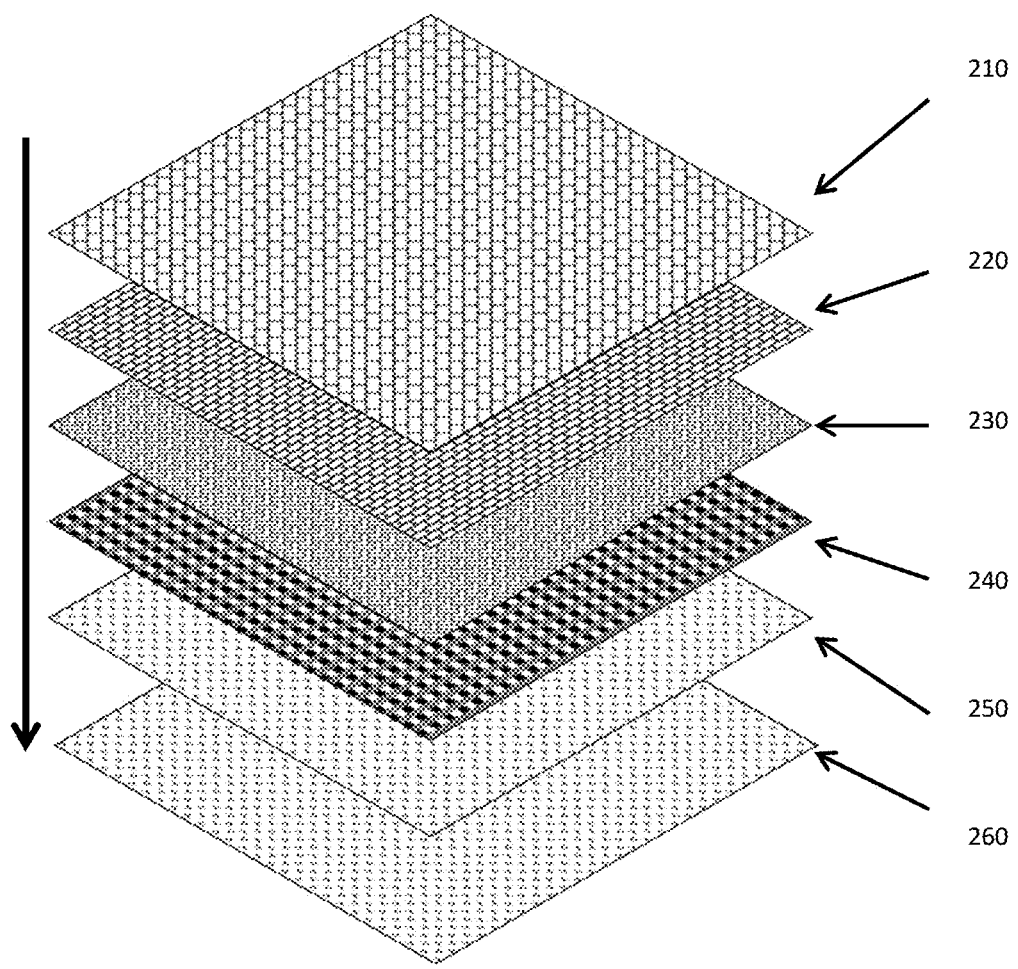
FIG. 2 is a flowchart illustrating that methodologies for determining liveness may be part of an enrollment process, as well as a matching/recognition process.
Figure 3:
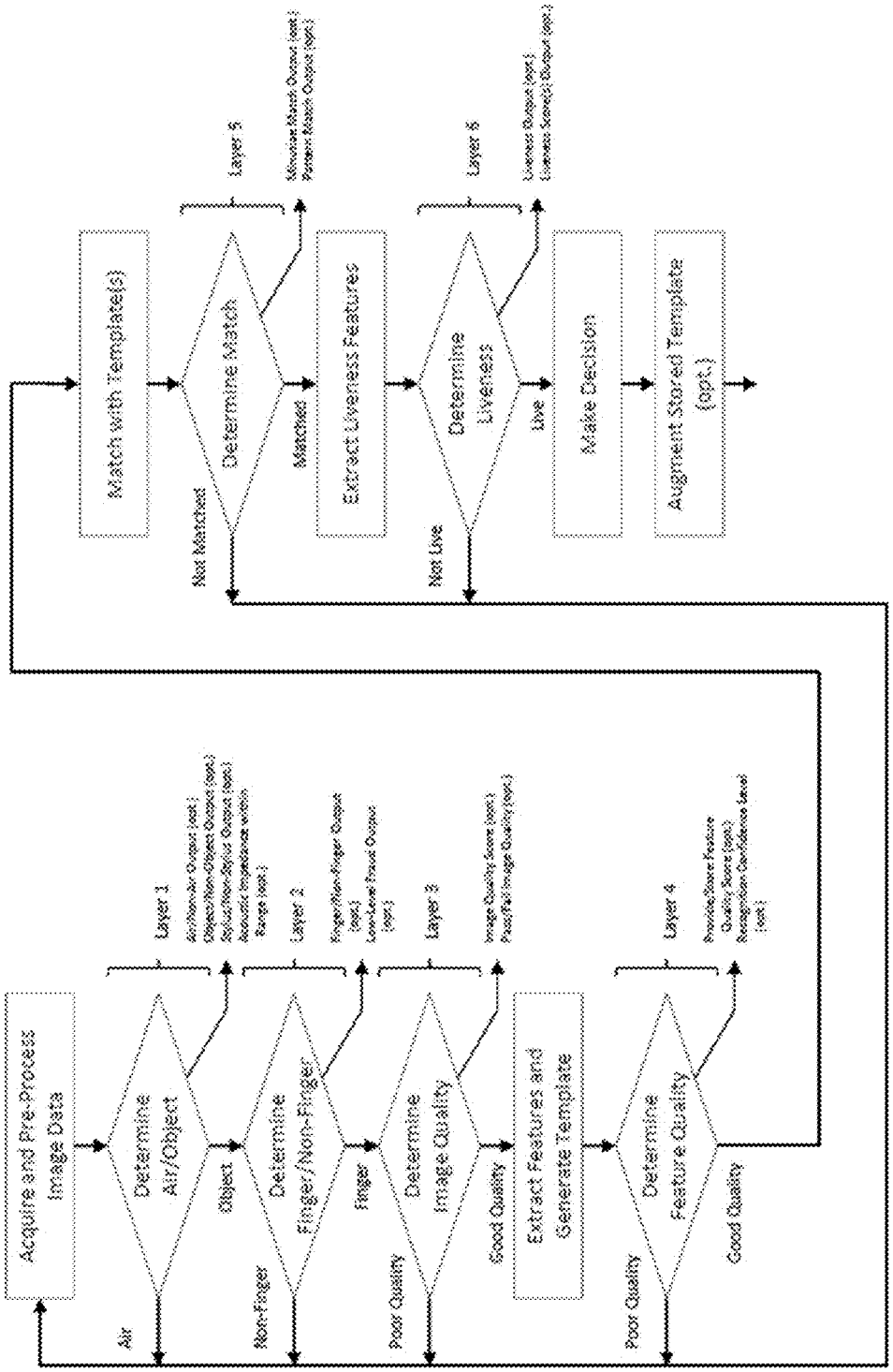
FIG. 3 is a flowchart showing additional detail about how methodologies for determining liveness might be utilized in a matching/recognition process.

FIGS. 2-3 illustrate various systems and methods that may be used to evaluate an image of a biometric object. The systems and methods include determining whether an image of a biometric object is of a live individual.

FIG. 2 shows a schematic of an exemplary biometric authentication method, which may be used in conjunction with one or more additional systems for evaluating fingerprints. In one implementation, the system can be embodied as separate layers for filtering the image of a detected biometric object. For example, the layers can be software-based filters that are used to improve efficiency, accuracy, security, and/or usability.

The biometric authentication method can include a skin-like object detection layer 210, which can be used to filter one or more of the following features: air and object; skin and non-skin; finger and stylus. In one particular example, the skin-like object detection layer 210 can determine whether a detected acoustic impendence is within a particular range. In practice, ultrasound waves propagate through mediums of varying acoustic impedance. Therefore reflection and transmission coefficients of ultrasound can be used to obtain images. Acoustic impedance can be the product of biometric-density and phase velocity, respectively. As such, the acoustic impedance values may be different for ridges and valleys in the biometric. In some implementations, the variation between acoustic impedance in the ridges and valleys may be determinative, and thus it may not be necessary to detect a quantitative acoustic impedance.

The biometric authentication method can include a finger detection layer 220, which can be used to filter one or more of the following features: fingerprint and non-fingerprint pattern; ridge, ridge flow, and fingerprint edge. The finger detection layer 220 may involve a determination of whether the object includes typical fingerprint patterns (e.g., ridges and valleys). Alternatively, or additionally, the finger detection layer 220 may involve determining whether an object has an acoustic impedance that is within an acoustic impedance range corresponding to that of skin. In some examples, determining whether the object is a finger may involve distinguishing a finger from another body part. Determining whether the object is a finger may involve determining that a non-finger object is a stylus. The finger detection layer 220 may provide a finger/non-finger output signal indicating whether a finger is on the fingerprint sensor. The finger detection layer 220 may provide an acoustic impedance output signal indicating whether the acoustic impedance of an object on the fingerprint sensor is within a predetermined range. The finger detection layer 220 may provide a low-level fraud output signal indicating whether an object on the fingerprint sensor may be a fraud. The finger detection layer 220 may provide a stylus/non-stylus output signal indicating whether a tip of a stylus is on the sensor.

The biometric authentication method can include an image qualification layer 230 to measure the quality of a biometric image, and in some instances, invoke a routine to improve the quality of the image. In some examples, the image qualification layer 230 can be used to perform one or more of the following features: filter low-quality fingerprint images, provide an image quality score, and enhance or re-acquire an image. The image qualification layer 230 may provide an image quality output signal indicating whether an image quality is above a threshold.

The biometric authentication method can include a template qualification layer 240, which may involve quality scoring of fingerprint features and/or templates, and may involve providing an indication of fingerprint matching confidence. The template qualification layer 240 can be used to perform one or more of the following features: provide a feature quality score, a template quality score, and match confidence prediction. For example, the image qualification layer 230 may provide and/or store a feature quality output signal indicating a level of quality for a feature. The image qualification layer 230 may provide and/or store a template quality output signal indicating a level of quality of a template. The image qualification layer 230 may provide a recognition confidence level output signal indicating a level of confidence that a template could be matched, or whether the recognition confidence level is above a predetermined threshold. One or more of these output signals may be stored, sent to or otherwise provided to various software applications running on a mobile device.

The biometric authentication method can include a matching/enrollment layer 250, which can be used to perform pattern or minutiae matching. In this example, a fingerprint template can be generated based, at least in part, on extracted features of a biometric object. For example, fingerprint template information can be generated that may include the type, size, location and/or orientation of fingerprint patterns and/or fingerprint minutiae.

The biometric authentication method can include a liveness detection layer 260, which can be used to determine liveness. The liveness detection layer may be used to provide a liveness detection output score or make a determination of liveness. The liveness detection layer can be specifically be embodied as one or more of the following methods and systems described further herein.

FIG. 3 depicts a first implementation of a method of detecting liveness. The method can include obtaining an image of a biometric object. The image may be a visual representation of the biometric object and/or a data representation of the biometric object. Although not visually recognizable as an image of the biometric object, the data representation may nonetheless contain identifying data corresponding to the biometric object. In one particular implementation, only a single ultrasonic image of a biometric object is obtained. An image block can be formed from the ultrasonic image. For example, the image block may be selected to include relevant areas of the image, such as, areas containing a fingerprint or fingerprint features. The image block may be subdivided into a plurality of sample blocks. The sample blocks may be of the same, different, or overlapping areas. For example, certain areas of the image block may be divided into larger or smaller sample blocks based on the content of the image block. Feature vectors in a spatial domain and a frequency domain can be extracted from the image block. In one particular implementation, the feature vectors are extracted from each of the plurality of sample blocks. The feature vectors from each of the plurality of sample blocks can be compared to a classification model. The comparison can be used to make a classification or determination of liveness.

Figure 4:
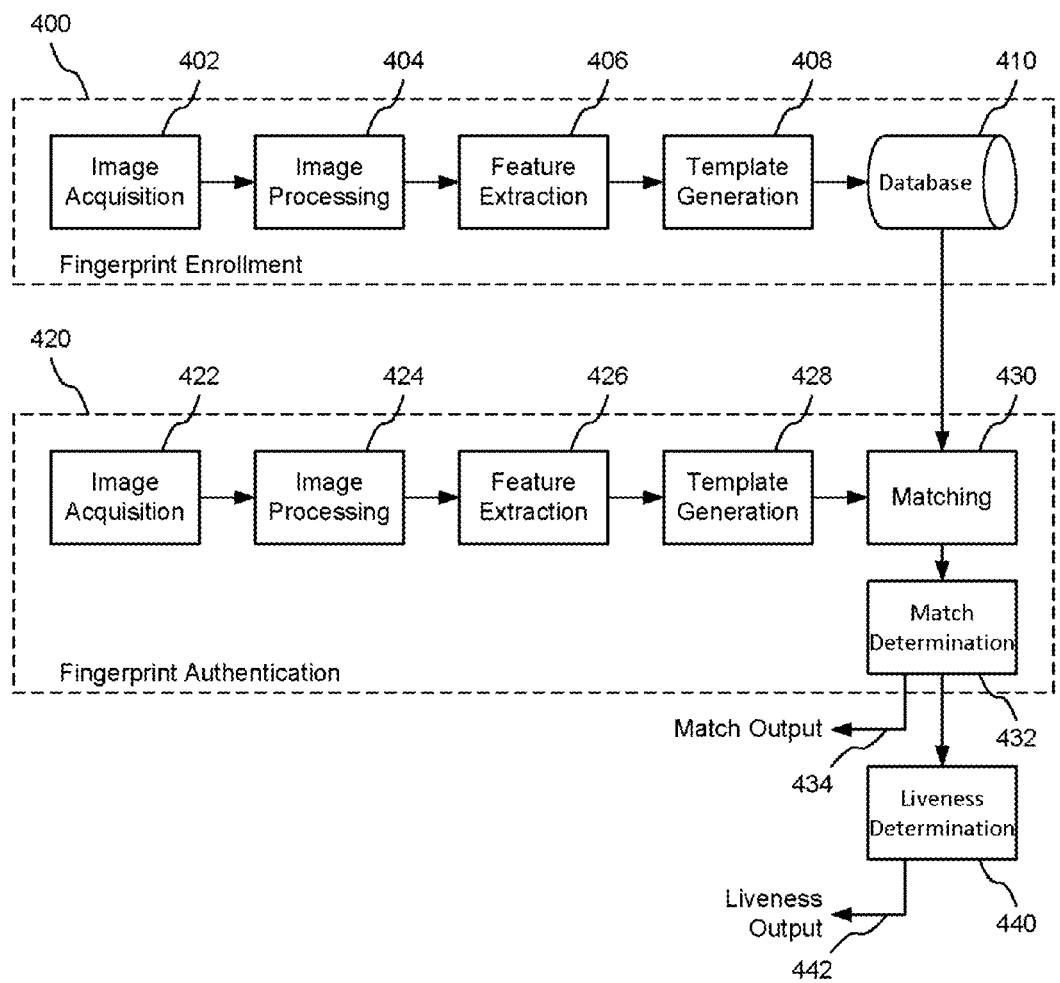
FIG. 4 is a flowchart showing additional detail about how methodologies for determining liveness might be utilized in a matching/recognition process.

FIG. 4 illustrates generalized flows for fingerprint enrollment and/or authentication followed by a liveness determination stage according to aspects of the present disclosure. In this example, block 400 describes the enrollment process and block 420 describes the verification/authentication process. During enrollment, an acquired image may be processed to generate a template (e.g. template information, template data, biometric reference data, or reference) that may be stored in a local or external database 410. Note that a reference may include one or more templates, models, or raw images. In some implementations, the enrollment process may include image acquisition 402, image processing 404, feature extraction 406, template generation 408, and data storage in a database 410.

The pattern types may be stored as part of a template associated with an object such as a finger. In some implementations, pattern classifications may be determined during enrollment. The pattern types and pattern classifications may be used in part for authentication or verification. During a verification sequence, the pattern types and/or pattern classifications for a particular user may be updated. The updated pattern types and/or pattern classifications may be stored in a modified template.

The verification/authentication process in block 420 may include image acquisition 422, image processing 424, feature extraction 426, template generation 428, fingerprint matching 430 using information stored in the database 410, and match determination 432 to determine and provide a match output signal 434. In the identification/verification/authentication stage, each acquired image may be processed to generate a template; the generated templates may be used for matching. The fingerprint verification/authentication block 420 may provide a match output signal 434 indicating whether a match has occurred.

One or more liveness determination stages 440 may perform various temporal analyses and/or expected biometric analyses to determine whether a finger is real or fake and whether the finger is dead or alive. A liveness output signal 442 may be provided that indicates a liveness determination. In some implementations, a liveness determination 440 to provide a liveness output signal 442 may be made during the fingerprint enrollment block 400. In some implementations, the liveness output signal 442 may be provided to determine whether to enroll a user. In some implementations, the liveness output signal 442 may be provided to determine whether to verify, identify, or authenticate a user. For example, the liveness output signal 442 may be combined with a match output signal 434 to determine whether to authenticate or verify a user. A positive match output signal 434 and a positive liveness output signal 442 may be combined to allow access or to allow a requested activity. In some implementations, the liveness output signal 442 may be generated and provided to a software application or an application running on a mobile or non-mobile device. In some implementations, pattern types may be determined during enrollment.

Figure 5A:
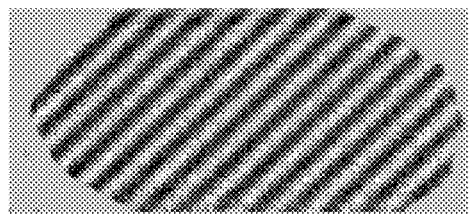
FIG. 5A depicts a collected fingerprint image.
Figure 5B:
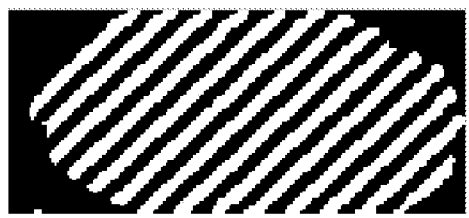
FIG. 5B depicts a ridge-valley mask.

FIG. 5B is a fingerprint image showing its ridge-valley mask. Feature vectors may be extracted from the image that can be used in determining liveness. In one implementation, raw textural information, such as histogram-based features ("histogram-features"), can be extracted for both ridge and valley from an image, such as an ultrasonic image. For example, information may be obtained about the ultrasonic impedance characteristics of ridges and valleys of a finger, for example, by scanning the fingerprint with an ultrasonic scanner. Histogram features may be related to an entire image block, a subset of the image block, or along a vector superimposed on the image. The obtained information may be statistically analyzed to determine histogram-features corresponding to the obtained information. For example, histogram-features that may be used to distinguish between a real finger and a fake finger include:

$Eg^r = \Sigma_{k=1}^{L^r} H^r(k)^2$  Ridge energy $Ep^r = \Sigma_{k=1}^{L^r} H^r(k) \log(H^r(k))$  Ridge entropy $\sigma^r = \Sigma_{k=1}^{L^r} (k-\mu^r)^2 H^r(k)$  Ridge variance $s^r = \Sigma_{k=1}^{L^r} (k-\mu^r)^3 H^r(k)/(\sigma^r * \sigma^r * \sigma^r)$  Ridge skewness $f^r = \Sigma_{k=1}^{L^r} (k-\mu^r)^4 H^r(k)/(\sigma^r * \sigma^r * \sigma^r * \sigma^r)$  Ridge kurtosis $\varsigma^r = \sigma^r/\mu^r$  Ridge variance coefficient $Eg^v = \Sigma_{k=1}^{L^v} H^v(k)^2$  Valley energy $Ep^v = \Sigma_{k=1}^{L^v} H^v(k) \log(H^v(k))$  Valley entropy $\sigma^v = \Sigma_{k=1}^{L^v} (k-\mu^v)^2 H^v(k)$  Valley variance $s^v = \Sigma_{k=1}^{L^v} (k-\mu^v)^3 H^v(k)/(\sigma^v * \sigma^v * \sigma^v)$  Valley skewness $f^v = \Sigma_{k=1}^{L^v} (k-\mu^v)^4 H^v(k)/(\sigma^v * \sigma^v * \sigma^v * \sigma^v)$  Valley kurtosis $\varsigma^v = \sigma^v/\mu^v$  Valley variance coefficient The histogram-features may be used to obtain ratio-features. These ratio-features are another example of a vector feature that may be used to determine whether the imaged object is live or not. In many instances, ratio-features may be a ratio of individual features between ridge and valley. Ratio-features may be related to the entire image block, a subset of the image block, between one or more ridge/valley combinations, or along a vector superimposed on the image. Such ratios may include:

$R_u = \mu^r/\mu^v$  Ratio of mean of ridge and valley $R_{ud} = med^r/med^v$  Ratio of median of ridge and valley $R_{eg} = Eg^r/Eg^v$  Ratio of energy of ridge and valley $R_{ep} = Ep^r/Ep^v$  Ratio of entropy of ridge and valley $R_{var} = \sigma^r/\sigma^v$  Ratio of variance of ridge and valley $R_{skew} = s^r/s^v$  Ratio of skewness of ridge and valley $R_{kurt} = f^r/f^v$  Ratio of Kurtosis of ridge and valley $R_{cv} = \varsigma^r/\varsigma^v$  Ratio of variance coefficient of ridge and valley These ratio-features can be measurements of the image statistics of ridges and valleys of the imaged object. As an example, ratio-features from real fingerprint images and ratio-features from fake fingerprint images each may show a distribution in feature domain, which can be used to determine whether the imaged object was real or fake.

In some implementations, the method can take into account the ridge and valley of an imaged object simultaneously, such as by extracting features that take into account a ridge and valley simultaneously. For example, cross-ridge-valley-features may include co-occurrence characteristics of ridge and valley, as well as the transition pattern of ridge-to-valley and valley-to-ridge in terms of gray scale values representing acoustic impedance of the imaged object. Cross-ridge-valley-features may be displayed, analyzed, or compared in spatial and/or frequency domains, such as one or more of the following: ridge and valley separation in gray scale values, ridge/valley width, ridge-to-valley transition rate, valley-to-ridge transition rate, and the frequency spectrum of the fast Fourier transform of the gray scale profile along a certain direction. The direction can be defined using a vector, such as the direction that is perpendicular to the ridge flow of the biometric object. Such cross-ridge-valley-features may be useful in identifying co-occurrence characteristics of the ridge and valley as well as the changing pattern of ridge-to-valley and valley-to-ridge. This may be carried out in terms of gray scale levels in the image. In one example, the grey level profile in the direction perpendicular to the ridge flow may be analyzed, and various features extracted to characterize the co-occurrence of the ridge and valley, in both spatial and frequency domains. For instance, one or more of the following features may be extracted: ridge and valley separation, width ratio, ridge and valley changing rate, power spectrum of a fast Fourier transform. Additional features of the co-occurrence of the ridge and valley, in both spatial and frequency domains, may additionally be used.

Methods that identify textural components, for example, methods that take into account a ridge and valley of an imaged biometric, can be more difficult to spoof than methods that merely identify geometric components. In contrast to fake biometrics, which can be made to have similar geometric components to a live fingerprint relatively easily, a fake biometric will have a noticeably different gray level distribution across ridges and valleys as compared to a real biometric. The gray level distribution across ridges and valleys can therefore be used to more reliably distinguish between a spoof image and real image of a biometric object.

Figure 6A:
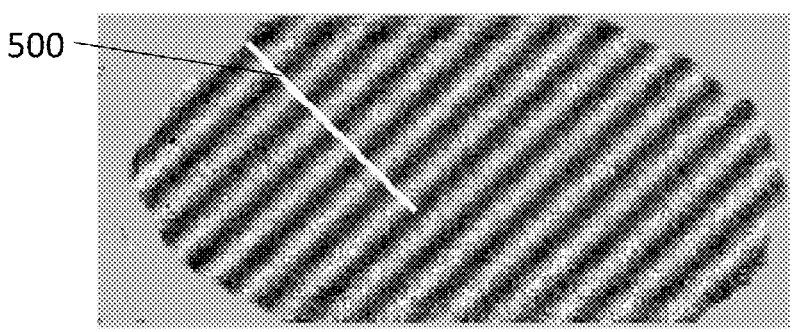
FIG. 6A depicts a fingerprint image with a vector superimposed on the image.
Figure 6B:
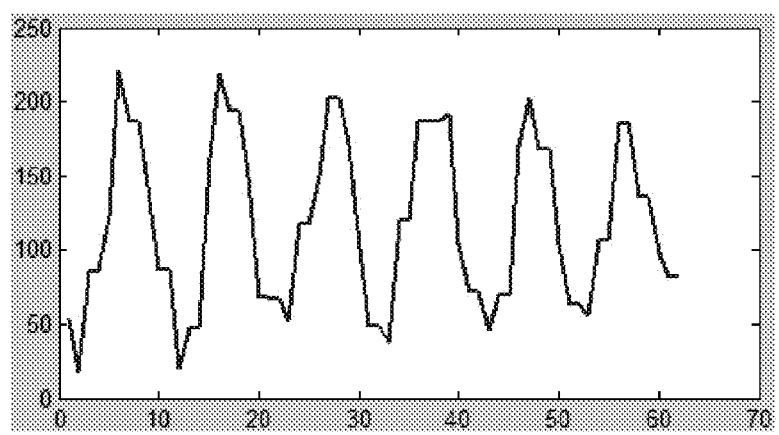
FIG. 6B depicts a brightness profile taken along the superimposed vector in FIG. 5A.

FIGS. 6A and 6B provide examples of a cross-ridge-valley measurement. According to this example of a cross-ridge-valley measurement, the two-dimensional spatial pattern consistency of the ridge and valley of an imaged object can be extracted. FIG. 6B is a plot showing the brightness profile along the line segment 500 shown in FIG. 6A, which crosses several fingerprint ridge/valley pairs. The x-axis units represent the pixel location along the selected direction, and the y-axis is the gray scale values of each pixel along the line segment 500. The brightness profile in FIG. 6B is therefore a characterization of the ridge/valley pairs along the line segment 500 of the image of FIG. 6A. A measure of the image brightness of ridges and a measure of the image brightness of the valleys can be used to determine liveness. In particular, the mean of the image brightness of the ridges can be determined, the mean of the image brightness of the valleys is determined, and then a ratio of these two brightness measurements is calculated according to the following equation:

$$CRV_{BT}=\text{mean(local maximums)/mean(local minimum)}$$

A fingerprint of a live being may produce image patches, e.g. a portion of the image, that produce a more limited value-range for $CRV_{BT}$ than image patches provided by a fake fingerprint.

In another method using one or more cross-ridge-valley measurements, a frequency-domain signature can be determined according to the following equation:

$$CRV_{freq}=(Mag(F_{i\_max})+\alpha(Mag(F_{i\_max-1})+Mag(F_{i\_max+1})))/\Sigma Mag(F_i)$$

where F is the Fourier transform of the brightness profile, i_max is the index of the term with the largest magnitude (excluding DC components), and α is an adjustable parameter to smooth the value in the neighborhood of the maximum magnitude. A fingerprint image patch of a live being can produce larger values for $CRV_{freq}$ than image patches provided by a fake fingerprint. In particular, a fake fingerprint can generate images with higher frequency noise, and a less clear ridge/valley pattern. Thus, the energy of a fake image in the frequency domain can distribute to more frequencies than a genuine image—thereby making the quality value for the genuine image higher than a fake image.

According to another implementation, one or more image quality measurements may be included in a feature vector. The image quality measurement can be one or more of the following: the number of connected components in the fingerprint image, the smoothness of the components, the entropy of the orientation distribution, and the strength (i.e. the clarity/sharpness) of the ridge and valley. Below are three examples of image quality measurements.

$$OS=\Sigma_{(i,j)}\Sigma_{(k,l)}1-abs(Ori(i,j)-Ori(i-k,j-l))/(Ori(i,j)+Ori(i-k,j-l)) \quad \text{Ridge orientations smoothness}$$

Where Ori(.,.) is the orientation map computed on the fingerprint image, (i,j) is a specific location, (k, l) spans a small window around pixel (i,j).

Good quality image patch tends to have larger values for this feature and poor quality image patches tend to have smaller values for this feature. A fake fingerprint usually presents poorer image qualities. This can be because an image of a fake fingerprint can exhibit more variation in orientaions in the local window, thereby resulting in a smaller OS value. In contrast, images of genuine fingeringrint can produce more uniform orientation in the local window, thereby resulting in a larger OS value than a fake fingerprint.

$$OCL=(H(i\_max)+\alpha(H(i\_max-1)+H(i\_max+1)))/\Sigma H(i) \quad \text{Ridge orientation certainty level}$$

Where H is the histogram of orientations in the block, I_max is the index of the histogram with maximum value; α is an adjustable parameters Good quality fingerprint patch tends to have larger value for this feature and poor quality patch tends to produce smaller values. This can occur because images of a genuine fingerprint can have clearer ridge/valley patterns with less variation, which can be more focused in one dominant orientation than a fake fingerprint.

$$GQual=\Sigma stdv(Gabor_i(I-Gaussian(I))) \quad \text{Gabor-based features}$$

Where stdv is to compute the standard deviation, $Gabor_i$ is the $i^{th}$ Gabor filter associated with a certain orientation, frequency and Gaussian smoothing window. These parameters can be taken empirically based on experiments.

Good quality fingerprint patches can have a larger value for this feature because of their clearer ridge flow information. In particular, genuine fingerprint images of good quality can have a high response to only one or two Gabor filters because it may have one or two major orientations. Fake fingerprint images of poor quality can have a higher response to all Gabor filters. Therefore, the standard deviation of all of the filter response for a genuine image can be higher than fake images.

Yet another methodology may be based on capturing special image patterns generated during the imaging process by different finger materials (e.g. skin and non-skin; living and non-living). For example, this group of features may characterize the image information contributed by an actual fingerprint (e.g. the fingerprint texture shown in the image) and the detailed information, which could be from the difference in the ultrasound impedance of sensing material (skin vs. non-skin), or the imaging process noise. The way the skin and non-skin materials respond to the ultrasound signal is different, and the special patterns presented in the images are different in terms of these feature measurements. In one such method, wavelet-based features are used to determine a measure of the wavelet packet decomposition, which would provide an approximation and a detail component of the original image. The features from the approximation component could include:

image energy ("Eg"),
modified entropy measure ("Ep"),
skewness ("s"), and/or
Kurtosis ("f")

of the approximation component from wavelet packet decomposition.

The features from the detail component could include:
image energy ("Eg"),
entropy ("Ep"), variance ("var"),
skewness ("s"), and/or
Kurtosis ("f")
of the detail component from wavelet packet decomposition.
Wherein:

$$Eg = \Sigma\Sigma(I(i,j)-\mu)(I(i,j)-\mu)$$

$$Ep = \Sigma\Sigma(I(i,j)-\mu)\log|I(i,j)-\mu|$$

$$s = \Sigma\Sigma(I(i,j)-\mu)*(I(i,j)-\mu)/(I(i,j)-\mu)/(\sigma*\sigma*\sigma)$$

$$f = \Sigma\Sigma(I(i,j)-\mu)*(I(i,j)-\mu)/(I(i,j)-\mu)*(I(i,j)-\mu)/(\sigma*\sigma*\sigma*\sigma)$$

where, $$\sigma = \text{sqrt}\left(\frac{\text{var}}{N-1}\right),$$

where N=image size, $\mu$ is the image mean.

It may be difficult to find a set of features that are universally optimal for all fingers. Therefore a subject-specific scheme may be utilized. In one such scheme, a classifier is trained for each individual user such that one user is authenticated as to liveness using a particular set of features and parameters that are different from those used to authenticate a different user with regard to liveness. In such a user-specific scheme, it is beneficial to have a large number of liveness features to choose from. The classifier may be programmed to identify the set of features and parameters that are best for each user.

Figure 7:
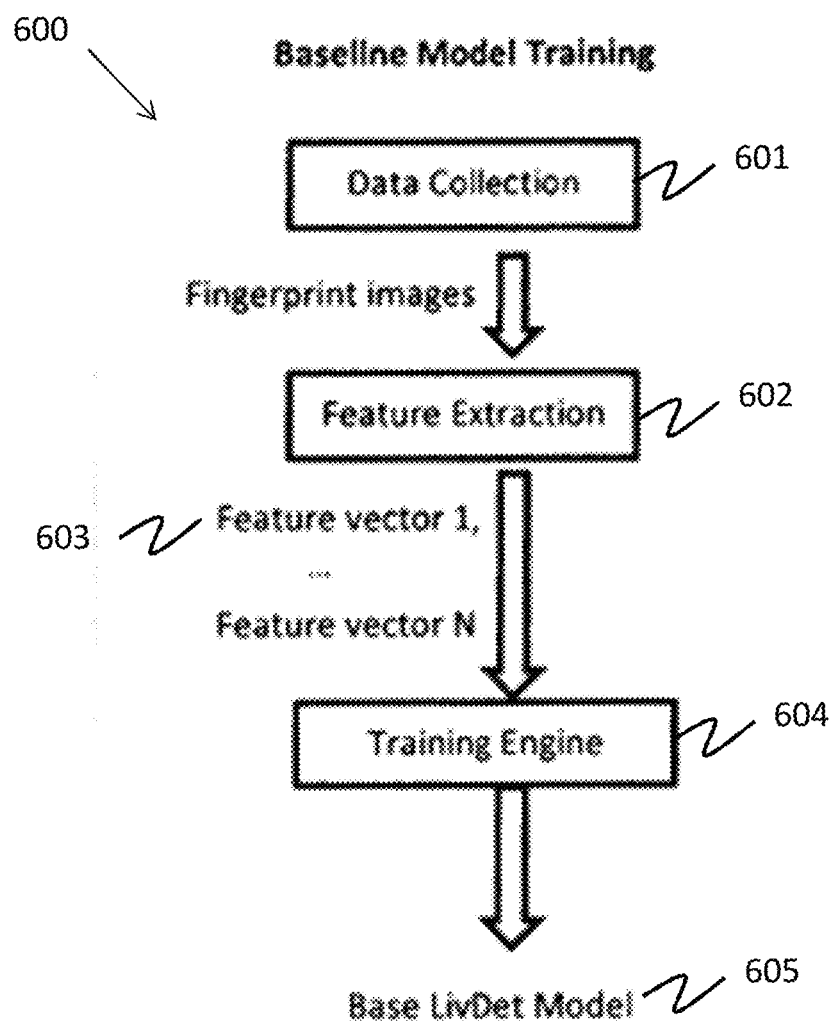
FIG. 7 is a flowchart depicting a baseline method for liveness detection.
Figure 8:
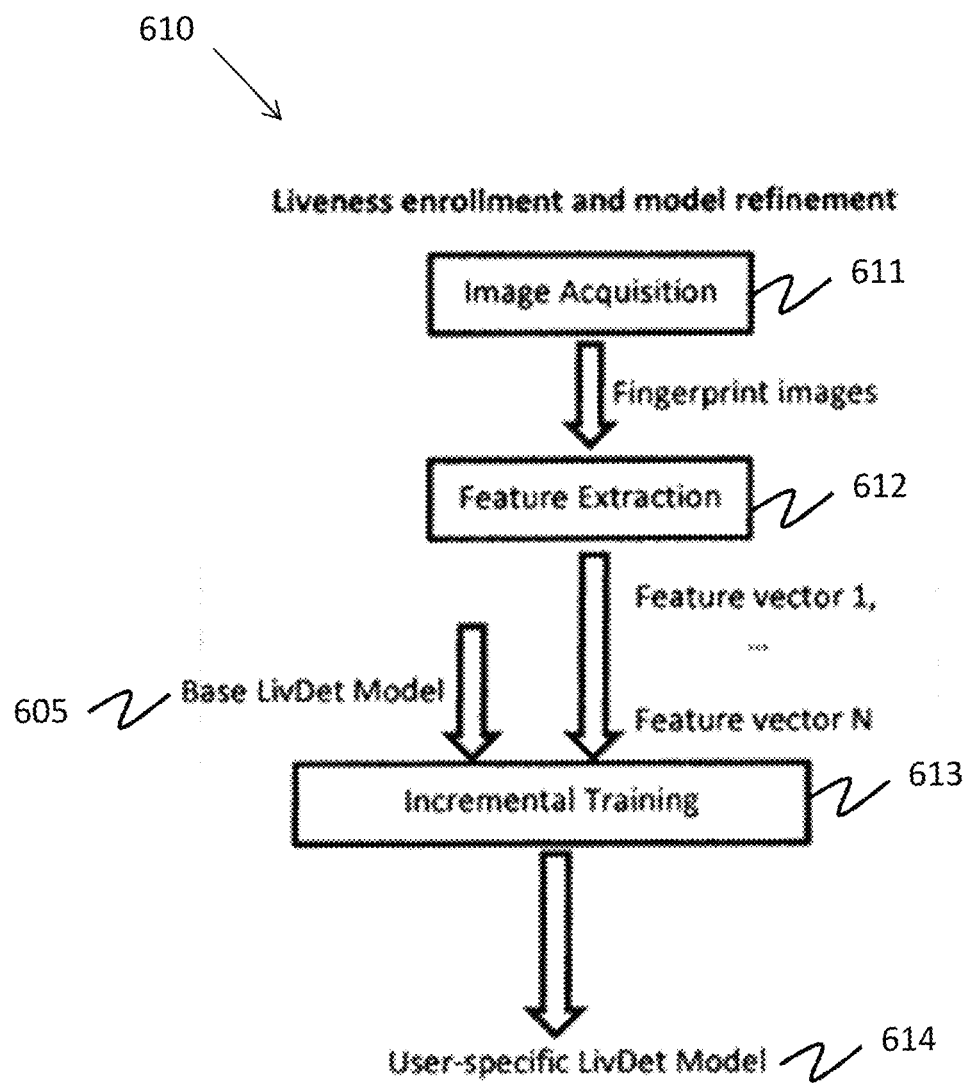
FIG. 8 is a flowchart depicting a liveness enrollment method for liveness detection.
Figure 9:
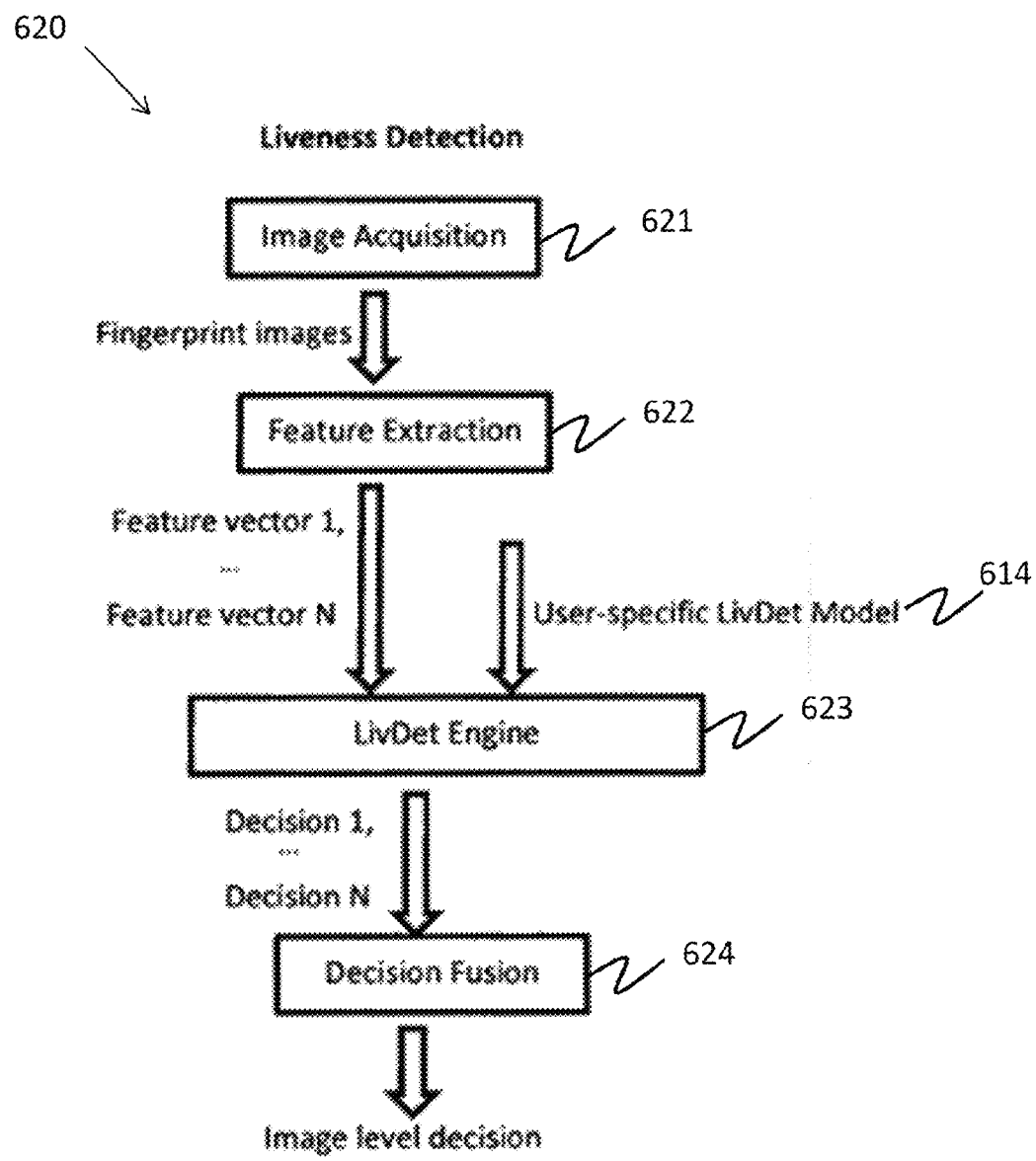
FIG. 9 is a flowchart depicting operation of a liveness detection method.

FIGS. 7-9 illustrate various methods that may be used to determine liveness of a biometric object. FIG. 7 provides a method of training 600 that provides baseline liveness detection model. A baseline liveness detection model can be trained using fingerprint data collected before the system is deployed for use. A first step 601 may include collecting large amounts of biometric data (e.g. fingerprint images) from both real and fake biometrics. A second step 602 may include extracting features from of a biometric image (e.g. one or more fingerprint images). The second step 602 can include having one or more block samples go through a feature extraction module. A third step 603 can include extracting one or more image features of the biometric image. The features can include one or more feature vectors, as further described herein. A fourth step 604 can include taking feature vectors from real and fake images as positive and negative samples. The feature vectors may be sent to a training engine, which could be a machine learning algorithm. The training engine can be used to create a classification model 605. The classification model may serve as a baseline model. The baseline model may be used with a system or method for determining liveness.

FIG. 8 provides a method 610 of enrollment and refinement of a liveness detection model. In the context of enrolling a new user to the method, the baseline model can be updated so that the model is tailored to the new user. In this manner, a higher level of accuracy of determining liveness may be available to the new user. According to the method 610, one or more images of a biometric object of a new user can be obtained 611. One or more feature vectors may be extracted 612 from the one or more images. An incremental training algorithm may be used 613 with the extracted feature vectors, along with the baseline model in order to create a new classification model 614. The new classification model 614, can therefore be tailored towards the liveness detection for a particular user.

FIG. 9 provides an implementation of a method 620 of determining liveness. The method 620 may be used, for example when a user is to be authenticated. The method 620 can include capturing 621 one or more images of a biometric object of the user, for example the user's fingerprint. In one particular example, a single ultrasonic image of the biometric object can be obtained. One or more feature vectors can be extracted 622 from the image. A liveness detection engine ("LivDet Engine") may process 623 the extracted feature vectors, along with a user-specific model in order to provide a liveness measurement. Based upon the liveness rating, a decision regarding liveness can be made. In some implementations, each feature vector can represent one sample of data. Consequently, each feature vector may be associated with a liveness measurement or decision. Decisions from the feature vectors can be fused 624 using one or more algorithms, including those algorithms described herein. A final decision, for example an image-level decision, can be reach and outputted.

Figure 10:
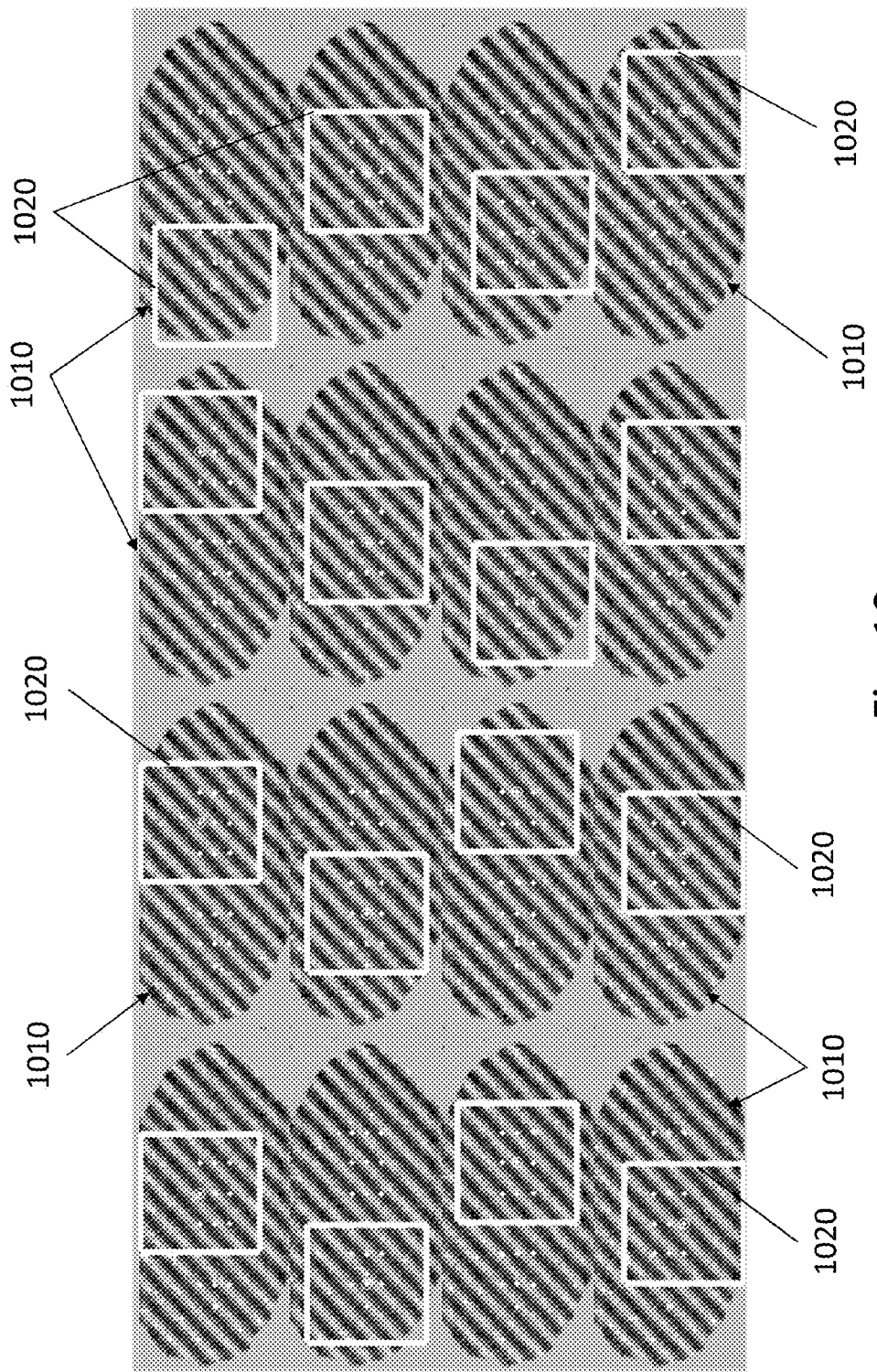
FIG. 10 depicts an image block and superimposed thereon are multiple sample blocks.

In order to extract sufficient information from a fingerprint scan, an oversampling strategy may be adopted so as to extract a large amount of data. Oversampling may be used to make a robust decision, despite issues related to a fingerprint scan, including possible sensor noise and poor fingerprint qualities. To illustrate one such method for oversampling, we define an "image block" to be a scan of a fingerprint like that shown in FIG. 10. The image block may be subdivided into sample blocks. There may be overlapping between sample blocks. In FIG. 10, multiple colors are used to better distinguish between sample blocks, and it should be noted that overlapping sample blocks that are drawn later are shown covering the earlier rendered sample block's color. Each sample block in FIG. 10 represents 8×8 pixels. It should be noted that sample blocks are defined only in areas containing fingerprint data. The number of pixels in the image block may depend on the sensor size and resolution. For a typical image block, there may be 50 to 200 sample blocks that can be used, and the actual number of usable sample blocks often depends on the size and quality of the fingerprint image.

For each sample block, one or more of the feature vectors described above may be extracted. So, for a particular image block, many types of features may be obtained for each sample block, and since there are many sample blocks in an image block, each type of feature may have a large number of data, thereby facilitating the production of a statistically significant sample. Another advantage of using multi-block overlapping sampling approach can be that the impact of a poorly imaged fingerprint area, which could be caused by worn fingerprints or defective sensor patches, may be minimized.

In order to determine whether a particular image block was taken from a live object, it may be necessary to settle upon a decision methodology that utilizes the data derived from the sample blocks. In one such decision methodology, each sample block contributes one feature vector, and based on that feature vector a determination as to liveness is made with respect to that sample block. With this methodology in mind, there can be at least two options regarding how to make a final decision regarding liveness: (1) majority voting; and (2) weighted voting. In a majority voting methodology, each sample block can "vote" equally as to whether a real fingerprint or a fake fingerprint is indicated by its feature vector. If the number of sample blocks indicating a real fingerprint outnumbers the number of sample blocks indicating a fake fingerprint, then a real fingerprint will be indicated. However, if the number of sample blocks indicating a real fingerprint does not outnumber the number of sample blocks indicating a fake fingerprint, then a fake fingerprint will be indicated.

In a weighted voting methodology, each sample block "votes", but some "votes" can be weighted more than other "votes". The weight for a particular sample block's vote could be derived from an image quality measurement of this block. Or, the weight could come from the probability of a sample being real or spoof fingerprint estimated by a learned model.

Such a decision-making model can allow for easy handling of situations in which multiple fingerprint images are available. In such a situation, sample blocks from all the images could be placed (in effect) in a sample pool, and a decision regarding liveness made based on that sample pool. Alternatively, individual image-level decisions could be fused in order to make a final decision regarding liveness.

Figure 11:
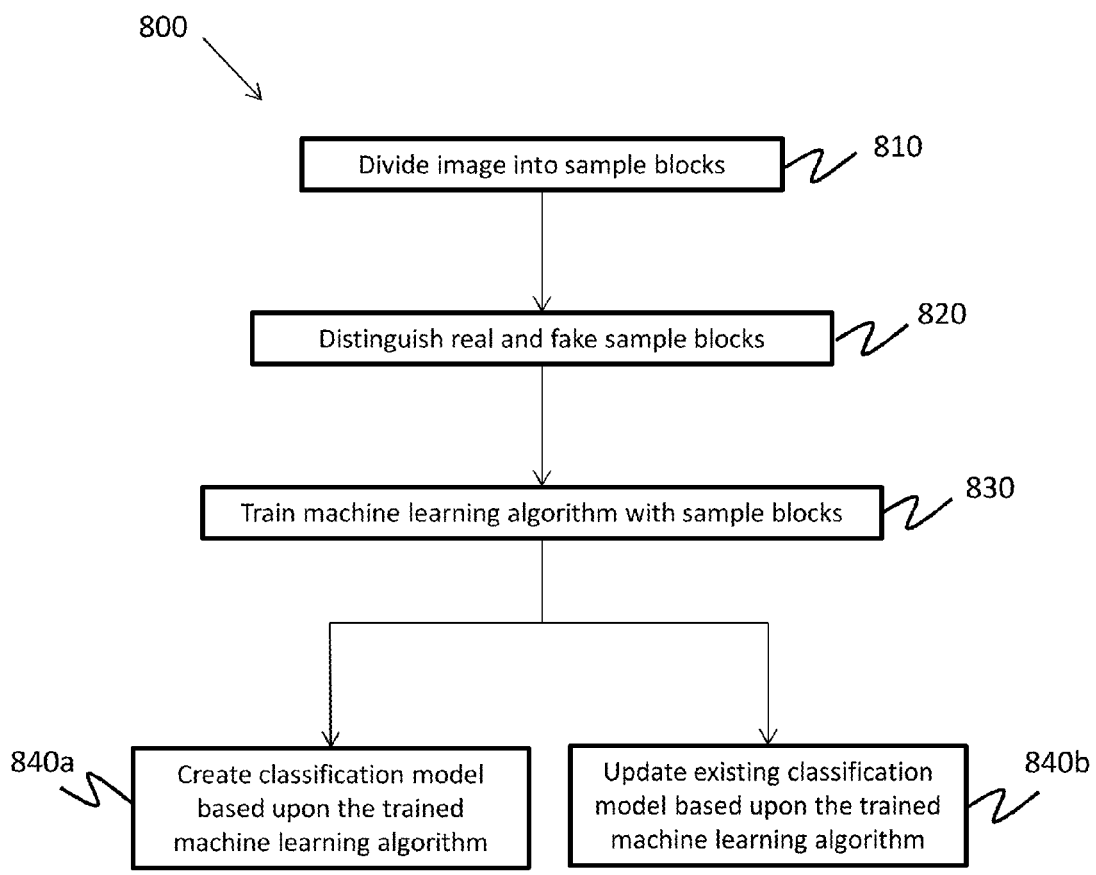
FIG. 11 is a flowchart illustrating a method of sample block division and classification model creation/updates.

According to another implementation, as shown in FIG. 11, a method of determining liveness 800 may include one or more machine learning algorithms to interpret data derived from the methods of determining liveness described above, including algorithms such as support vector machine (SVM), Random forest, and extreme learning machine (ELM). According to this method 800, an image of a biometric may be divided into sample blocks 810. The sample blocks may be distinguished 820 between real and fake. The machine learning algorithm can be trained 830 based upon the real and fake sample blocks. The output of the training may be used to create 840a a classification model, or to improve 840b an existing classification model, against which future sample blocks would be compared. As described previously, the classification model may be used in a comparison to determine whether an image is from a real or a fake biometric object.

Figure 12:
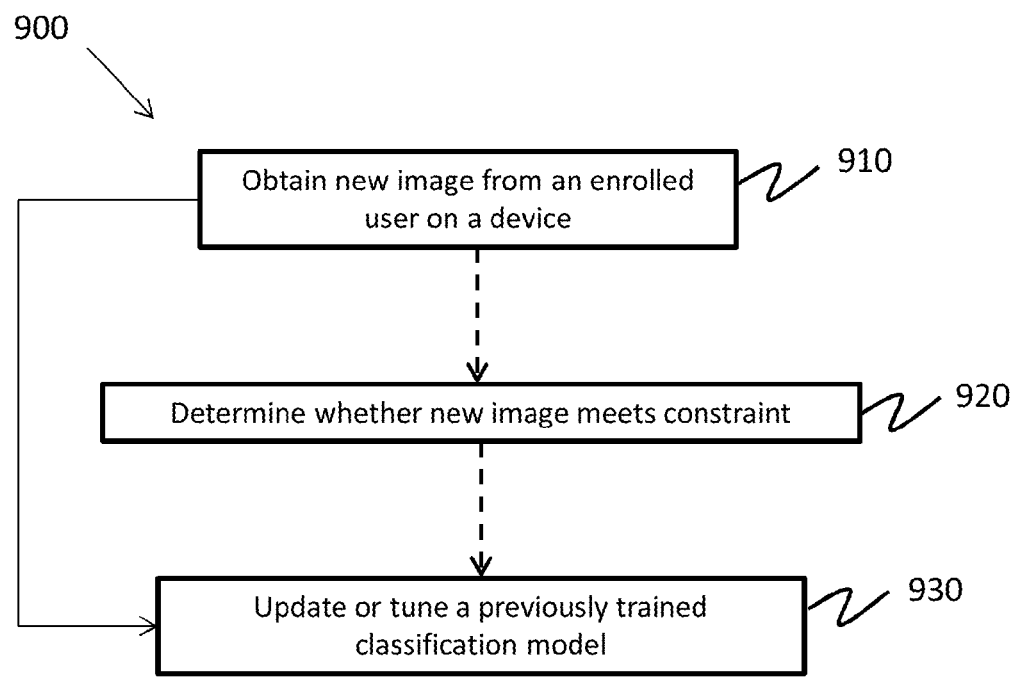
FIG. 12 is a flowchart illustrating a method of updating a classification model.

According to another implementation, as shown in FIG. 12, a method of determining liveness 900 may include an adaptive liveness detection model. The method 900 can include obtaining 910 a new image from an enrolled user after the user enrolls onto a device. The new image can be used to update or tune 930 a previously trained classification model. For example, the update or tune may be used to better tune the trained classification model to a specific individual, or more generally to improve a classification model or group of classification models to distinguish a real fingerprint from a fake fingerprint. An adaptive liveness detection model can advantageously updating the model as a biometric object (e.g. fingerprint) changes with time (e.g. due to frequent use, which leads to wearing out, or natural aging of the person). By updating the classification model according to a change in the biometric object, the accuracy of the system can be maintained—or possibly improved over time.

For security purposes, the method 900 may optionally determine 920 whether the new image meets one or more constraints before updating or tuning a previously trained classification model. For example, the method 900 may include constraints such as requiring that a biometric pass a matching process for (e.g. one or more biometric scans and authentication processes), and/or the fingerprint may need to pass a minimum threshold liveness determination in order to allow the classification model to update. These constraints can be used to avoid spoofing an adaptive liveness detection model to update its classification model according to a fake biometric image.

Figure 13:
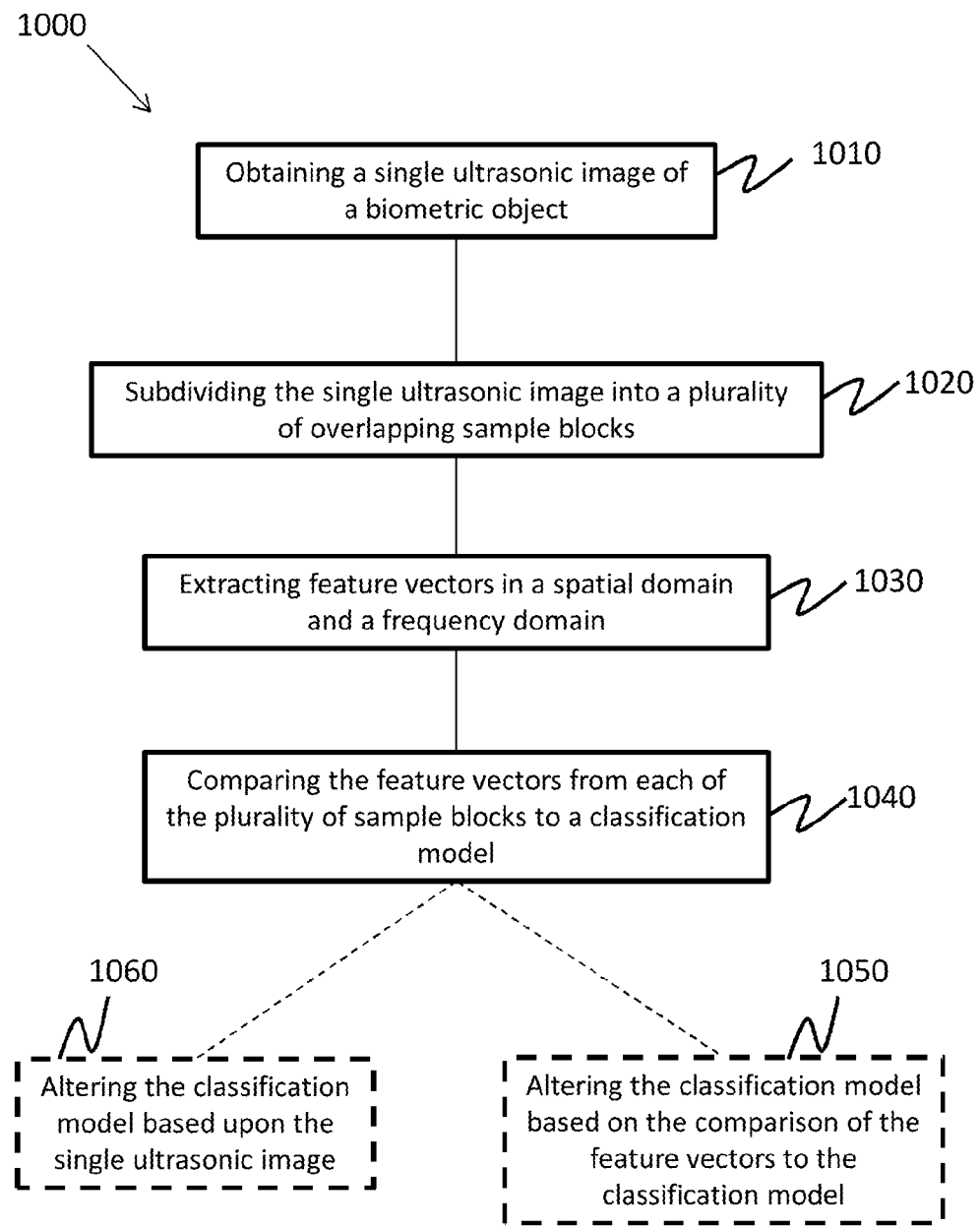
FIG. 13 is a flowchart illustrating one implementation of a method for determining liveness.

According to another implementation, as shown in FIG. 13, a method of detecting liveness 1000 may include the step of obtaining 1010 a single ultrasonic image of a biometric object. According to this method 1000, the single ultrasonic image may be subdivided into a plurality of overlapping sample blocks. The feature vectors may be extracted 1030 in a spatial domain and a frequency domain from each of the plurality of sample blocks. The feature vectors may be compared 1040 from each of the plurality of sample blocks to a classification model. In one implementation, the classification model may be altered 1060 based on the comparison of the feature vectors to the classification model. In another implementation, the classification model may be altered 1050 based on the single ultrasonic image of the biometric object.

Although the present disclosure has been described with respect to one or more particular implementations, it will be understood that other implementations of the present disclosure may be made without departing from the spirit and scope of the present disclosure. Hence, the present disclosure is deemed limited only by the appended claims and the reasonable interpretation thereof.

What is claimed is:

1. A method of detecting liveness, comprising:
   obtaining a single ultrasonic image of a biometric object;
   subdividing the single ultrasonic image into a plurality of overlapping sample blocks;
   extracting feature vectors in a spatial domain and a frequency domain from each of the plurality of sample blocks, the feature vectors including a histogram feature, the histogram feature including ultrasonic impedance characteristics of ridges and valleys of the biometric object; and
   comparing the feature vectors from each of the plurality of sample blocks to a classification model.

2. The method of claim 1, wherein the histogram feature includes one or more of the following: ridge energy, ridge entropy, ridge variance, ridge skewness, ridge kurtosis, ridge variance coefficient, valley energy, valley entropy, valley variance, valley skewness valley kurtosis, and valley variance coefficient.

3. The method of claim 1, wherein the feature vectors include ratio-based features.

4. The method of claim 3, wherein the ratio-based features include a ratio of individual features between ridge and valley of the biometric object.

5. The method of claim 3, wherein the ratio-based features include one or more of the following: ratio of mean of ridge and valley, ratio of median of ridge and valley, ratio of energy of ridge and valley, ratio of entropy of ridge and valley, ratio of variance of ridge and valley, ratio of skewness of ridge and valley, ratio of kurtosis of ridge and valley, and ratio of variance coefficient of ridge and valley.

6. The method of claim 1, wherein the feature vectors include cross-ridge-valley features.

7. The method of claim 6, wherein the cross-ridge-valley features include one or more of the following: ridge and valley separation in gray scale values, ridge and valley width, ridge-to-valley transition rate, valley-to-ridge transition rate, a frequency spectrum of a fourier transform of a gray scale profile along a direction, and a ratio of image brightness of ridges the biometric object to image brightness of valleys of the biometric object.

8. The method of claim 1, wherein the feature vectors include an image-quality measurement.

9. The method of claim 8, wherein the image-quality measurement includes one or more of the following: ridge orientations smoothness, ridge orientation certainty level, and a Gabor-based feature.

10. The method of claim 1, wherein the feature vectors include an image-pattern feature.

11. The method of claim 10, wherein the image-pattern feature is a wavelet-based feature.

12. The method of claim 1, wherein each of at least a subset of the plurality of sample blocks overlap with at least another of the subset of the plurality of sample blocks.

13. The method of claim 1, wherein comparing the feature vectors includes weighting a first set of the plurality of sample blocks relative to a second set of the plurality of sample blocks.

14. The method of claim 1, further comprising altering the classification model based upon the comparison of the feature vectors to the classification model.

15. The method of claim 1, further comprising altering the classification model based upon the single ultrasonic image of the biometric object.

16. A system for detecting liveness, comprising:
a computer processor configured to:
   obtain a single ultrasonic image of a biometric object;
   subdivide the single ultrasonic image into a plurality of overlapping sample blocks;
   extract feature vectors in a spatial domain and a frequency domain from each of the plurality of sample blocks, the feature vectors including a histogram feature, the histogram feature including ultrasonic impedance characteristics of ridges and valleys of the biometric object; and
   compare the feature vectors from each of the plurality of sample blocks to a classification model.

17. The system of claim 16, further comprising an ultrasonic sensor configured to scan the biometric object;
wherein the single ultrasonic image is obtained from the ultrasonic sensor.

18. The system of claim 16, wherein the feature vectors include ratio-based features.

19. The system of claim 16, wherein the feature vectors include cross-ridge-valley features.

20. The system of claim 16, wherein the feature vectors include an image-quality measurement.

21. The system of claim 16, wherein the feature vectors include an image-pattern feature.

22. A non-transitory computer readable medium storing computer executable code, the executable code comprising instructions to:
   obtain a single ultrasonic image of a biometric object;
   subdivide the single ultrasonic image into a plurality of overlapping sample blocks;
   extract feature vectors in a spatial domain and a frequency domain from each of the plurality of sample blocks, the feature vectors including a histogram feature, the histogram feature including ultrasonic impedance characteristics of ridges and valleys of the biometric object; and
   compare the feature vectors from each of the plurality of sample blocks to a classification model.

23. The non-transitory computer readable medium of claim 22, wherein the feature vectors include ratio-based features.

24. The non-transitory computer readable medium of claim 22, wherein the feature vectors include cross-ridge-valley features.

25. The non-transitory computer readable medium of claim 22, wherein the feature vectors include an image-pattern feature.

26. A system for scanning a finger comprising:
   means for obtaining a single ultrasonic image of a biometric object;
   means for subdividing the single ultrasonic image into a plurality of overlapping sample blocks;
   means for extracting feature vectors in a spatial domain and a frequency domain from each of the plurality of sample blocks, the feature vectors including a histogram feature, the histogram feature including ultrasonic impedance characteristics of ridges and valleys of the biometric object; and
   means for comparing the feature vectors from each of the plurality of sample blocks to a classification model.

27. The system of claim 26, wherein the feature vectors include cross-ridge-valley features.

28. The system of claim 26, wherein the feature vectors include an image-pattern feature.

* * * * *